(12) United States Patent
Georgi et al.

(10) Patent No.: US 8,150,563 B2
(45) Date of Patent: Apr. 3, 2012

(54) ANTI-THEFT SYSTEM FOR A VEHICLE, AND METHOD FOR THE OPERATION OF AN ANTI-THEFT SYSTEM

(75) Inventors: Thomas Georgi, Painten (DE); Roland Wagner, Kassel (DE)

(73) Assignee: Continental Automotive GmbH, Hannover (DE)

( * ) Notice: Subject to any disclaimer, the term of this patent is extended or adjusted under 35 U.S.C. 154(b) by 117 days.

(21) Appl. No.: 12/678,508

(22) PCT Filed: Sep. 18, 2008

(86) PCT No.: PCT/EP2008/062440
§ 371 (c)(1),
(2), (4) Date: Apr. 15, 2010

(87) PCT Pub. No.: WO2009/037312
PCT Pub. Date: Mar. 26, 2009

(65) Prior Publication Data
US 2010/0217457 A1    Aug. 26, 2010

(30) Foreign Application Priority Data

Sep. 18, 2007 (DE) .......................... 10 2007 044 398

(51) Int. Cl.
*G06F 17/00* (2006.01)

(52) U.S. Cl. .................... 701/2; 701/1; 701/19; 701/23; 701/24; 701/28; 370/342; 370/343; 340/870.18; 340/504; 340/5.53; 340/903; 340/503; 180/168; 180/272; 318/587; 455/200.1; 455/41.1; 455/41.2; 455/90.2; 455/500

(58) Field of Classification Search .............. 701/1, 33, 701/208, 301, 19, 23, 24, 28, 29, 36, 117, 701/118, 200; 370/342, 343; 342/357.06, 342/455, 903; 340/502, 540, 825, 825.02, 340/2.1, 3.9, 825.36, 825.39, 7.1, 825.49, 340/825.53, 903, 531, 870.18, 853.1, 853.2, 340/853.3, 853.9, 855.3, 855.4; 455/462, 455/466, 41.1, 41.2, 500, 90.2, 179.1–200.1; 398/125; 905/928, 933, 937, 988; 180/168, 180/272; 318/587; 307/10.1, 10.5; 705/13; 235/375, 384

See application file for complete search history.

(56) References Cited

U.S. PATENT DOCUMENTS 6,587,758 B2 * 7/2003 Obradovich et al. ............. 701/1
(Continued)

FOREIGN PATENT DOCUMENTS

| DE | 10221427 A1 | 12/2003 |
| DE | 10317658 A1 | 11/2004 |
| EP | 1041227 A1 | 10/2000 |

(Continued)

OTHER PUBLICATIONS

International PCT Search Report, PCT/EP2008/062440, 2 pages, mailed Jan. 9, 2009.

(Continued)

*Primary Examiner* — James Trammell
*Assistant Examiner* — McDieunel Marc
(74) *Attorney, Agent, or Firm* — King & Spalding L.L.P.

(57) ABSTRACT

An anti-theft system, especially in the form of an access and/or starting system for a vehicle has a vehicle-mounted receiver for receiving a request signal containing the instruction to find out whether objects that are associated with the vehicle, e.g. lost identifiers, are located in specific areas of the vehicle. The anti-theft system further has a vehicle-mounted control and evaluation unit for verifying whether the objects are in the specific areas of the vehicle and outputting information on whether an object that is associated with the vehicle has been found. The anti-theft system finally has a vehicle-mounted transmitter for transmitting a result signal containing the information on whether objects have been found. Such an anti-theft system allows an identifier, for example, which is associated with a user, to start a search from a distance in order to verify whether certain objects are located near or inside the vehicle.

20 Claims, 1 Drawing Sheet

U.S. PATENT DOCUMENTS

| | | | |
|---|---|---|---|
| 6,604,776 B2* | 8/2003 | Edwards | 296/152 |
| 6,909,362 B2* | 6/2005 | Tanaka | 340/426.28 |
| 6,945,366 B2* | 9/2005 | Taba | 188/1.12 |
| 7,350,615 B2* | 4/2008 | Maeno et al. | 180/287 |
| 7,499,778 B2* | 3/2009 | Obradovich | 701/30 |
| 7,598,847 B2* | 10/2009 | Fukagawa et al. | 340/426.25 |
| 7,915,998 B2* | 3/2011 | Matsubara et al. | 340/5.72 |
| 2007/0030119 A1 | 2/2007 | Ono et al. | 340/5.61 |
| 2007/0120644 A1 | 5/2007 | Seike | 340/5.61 |

FOREIGN PATENT DOCUMENTS

| | | |
|---|---|---|
| FR | 2879984 A1 | 6/2006 |
| JP | 2007016505 A | 1/2007 |
| JP | 2007146415 A | 6/2007 |

OTHER PUBLICATIONS

Letter and Japanese Office Action, Japanese Patent application No. 2010-525350, 9 pages, Nov. 25, 2011.

* cited by examiner

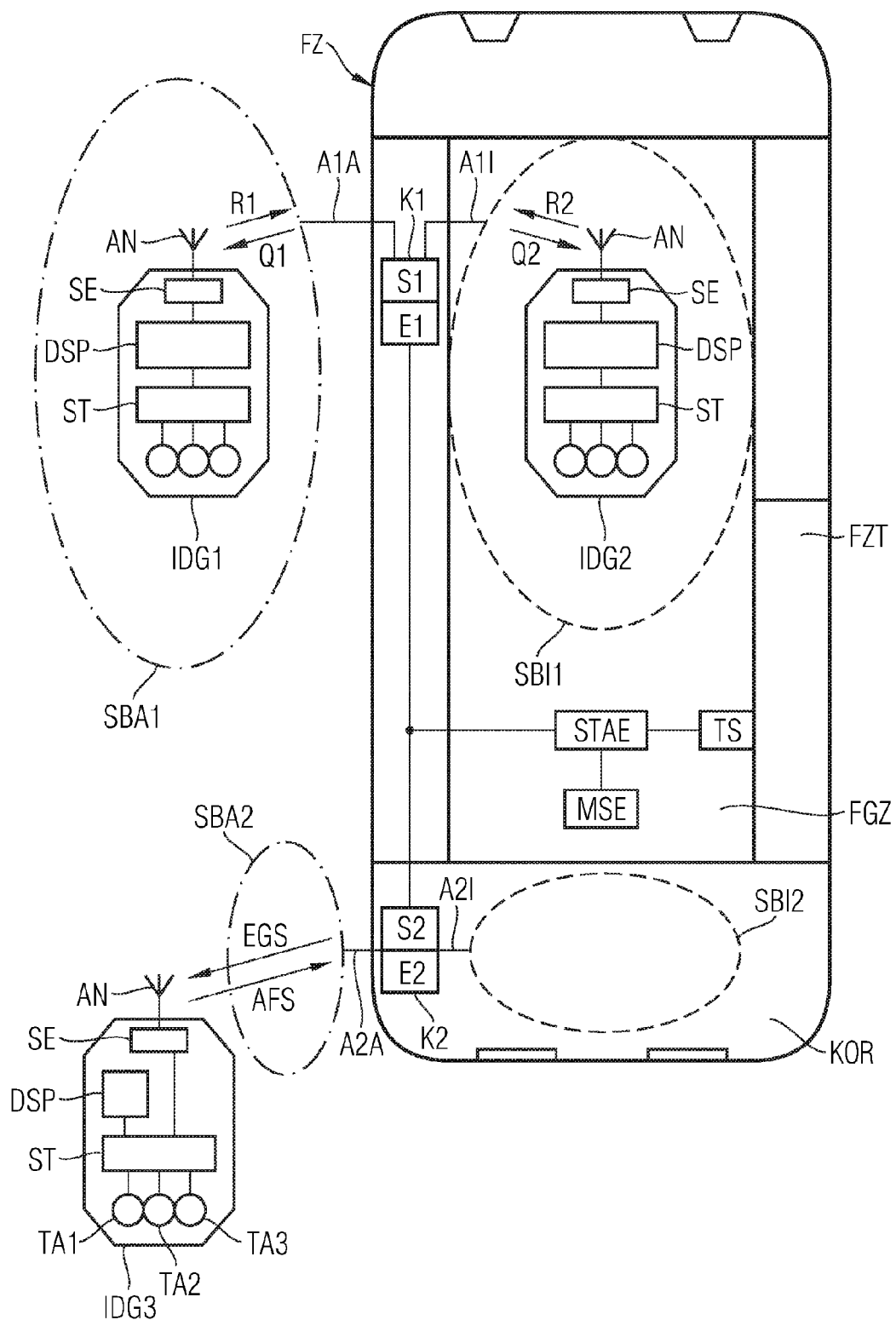

ANTI-THEFT SYSTEM FOR A VEHICLE, AND METHOD FOR THE OPERATION OF AN ANTI-THEFT SYSTEM

CROSS-REFERENCE TO RELATED APPLICATIONS

This application is a U.S. National Stage Application of International Application No. PCT/EP2008/062440 filed Sep. 18, 2008, which designates the United States of America, and claims priority to German Application No. 10 2007 044 398.8 filed Sep. 18, 2007, the contents of which are hereby incorporated by reference in their entirety.

TECHNICAL FIELD

The present invention relates to an anti-theft system, in particular in the form of an access and/or starting system of a vehicle, and to a method for operating such a protection system. The purpose of the anti-theft system, in addition to its main task of preventing the vehicle or items present therein from being stolen, is to locate objects associated with the vehicle in a particular area inside and/or outside the vehicle.

BACKGROUND

To prevent unauthorized access to a vehicle, modern access systems or rather access arrangements in vehicles use electronic security systems in which data is communicated between a first communication device of the user (a portable user identification device or identifier, such as a key or key fob) and a second communication device of the vehicle in order to authorize a user. If authorization is successful, a locking system of the vehicle is instructed to unlock a particular vehicle door or all the vehicle doors.

With so-called active access systems, authentication is initiated by a user pressing a particular vehicle unlocking button on his identifier, which then transmits an unlocking signal to the vehicle from a distance. With passive access systems or methods, an authentication code is initiated e.g. by contact with integrated proximity or locking sensors in a vehicle door handle; in response to this contact, the vehicle transmits a code request signal to the identifier which finally, on receiving the request signal, sends back a response signal with the corresponding authentication code to the vehicle. In the vehicle, checking of the received code can then take place and, in the event of a positive i.e. successful check, as already mentioned above, the vehicle or more specifically the vehicle doors are unlocked. It is also possible for an identifier, e.g. in the form of an electronic key, to be designed both for an active and a passives access method.

In the case of a vehicle starter system, in a similar manner to a passive access system, code information can be transmitted from the identification device to the vehicle by means of a dialog consisting of a request signal from the vehicle and a corresponding response signal from the identification device in order to enable, for example, an immobilizer to be deactivated or a vehicle propulsion system to be started.

In addition to the actual "short-range" application of obtaining access to a vehicle located in the immediate vicinity or of starting its propulsion system, longer-range applications are planned in which user identification devices such as vehicle keys can also communicate with the vehicle over greater distances. Modern access or starter systems are also designed such that they normally have a plurality of user identification devices or keys, for gaining access to the vehicle or starting the vehicle propulsion system. It may now happen that, for example, two people have been traveling in a vehicle, both of whom are carrying with them a key associated with the vehicle's access system. If the vehicle is parked, and the two people get out of the vehicle, and e.g. one of the people mislays the key inside the vehicle or outside in close proximity to the vehicle, this mislaid key represents a security risk, as it can be used by unauthorized persons to gain access to the vehicle and/or start the propulsion system. Particularly if the key slips down into poorly visible pockets in a side door of the vehicle, for example, or if it is lost outside the vehicle under a pile of mud or leaves, this makes it very difficult to notice that the user identification device has been mislaid and to subsequently locate it. The key is then mainly regarded as lost.

SUMMARY

According to various embodiments, a means of minimizing the loss of objects associated with the vehicle can be created.

According to an embodiment, in a method for operating an anti-theft system for a vehicle, a portable identifier associated with the anti-theft system performs the following step: transmitting a request signal with the instruction to detect the presence of objects associated with the vehicle in a particular area in and/or outside the vehicle; and a vehicle-mounted part of the anti-theft system performs the following steps: receiving the request signal; checking for the presence of objects in and/or outside the vehicle; transmitting a result signal with information as to whether objects associated vehicle have been found during checking for the presence thereof.

According to a further embodiment, presence checking may comprise the following steps: transmitting a request signal into the vehicle interior and/or exterior; checking whether a response signal of an object is received. According to a further embodiment, the portable identifier associated with the vehicle may also be designed to receive the result signal. According to a further embodiment, the objects associated with a vehicle include additional identifiers associated with the vehicle, or other items provided with a communication device. According to a further embodiment, during presence checking in the vehicle interior and/or vehicle exterior a plurality of request signals with different field strengths or a plurality of request signals at different positions can be transmitted.

According to another embodiment, an anti-theft system for a vehicle, may comprise a portable identifier for transmitting a request signal with the instruction to detect the presence of objects associated with a vehicle in a particular area in and/or outside the vehicle; a vehicle-mounted receiver for receiving a request signal; a vehicle-mounted control and evaluation device for checking for the present of objects in the one or more particular areas of the vehicle and for outputting information as to whether an object associated with the vehicle has been found; a vehicle-mounted transmitter for transmitting a result signal with the information concerning the finding of objects.

According to a further embodiment of the anti-theft system, to check for the presence of the objects, the vehicle-mounted control and evaluation device may cause the vehicle-mounted transmitter to transmit at least one request signal into one or more particular areas of the vehicle, and the vehicle-mounted control and evaluation device, depending on receipt of a respective response signal via the vehicle-mounted receiver, detects the presence of an object transmitting the response signal. According to a further embodiment of the anti-theft system, the portable identifier may also be designed, by means of an authentication, to effect locking or unlocking of the vehicle or to activate the propulsion system. According to a further embodiment of the anti-theft system, the result signal can be received by the portable identifier. According to a further embodiment of the anti-theft system, the portable identifier may have a display for indicating the content of the result signal to a user. According to a further embodiment of the anti-theft system, to check for the presence of the objects, the vehicle-mounted control and evaluation device may cause the vehicle-mounted transmitter to transmit a plurality of request signals of different field strengths. According to a further embodiment of the anti-theft system, the vehicle-mounted transmitter may have a plurality of antennas for mounting in different positions on the vehicle, wherein, to check for said presence, the vehicle-mounted control and evaluation device causes the vehicle-mounted transmitter to transmit a plurality of request signals at the different positions.

According to yet another embodiment, a vehicle, in particular a motor vehicle, may have an anti-theft system as described above.

BRIEF DESCRIPTION OF THE DRAWINGS

Exemplary embodiments will now be explained in greater detail with reference to the accompanying drawings in which:

FIG. 1 schematically illustrates a vehicle with an anti-theft system, in the proximity of which identifiers are present which are to be found by the vehicle-mounted part of the anti-theft system.

DETAILED DESCRIPTION

According to a first aspect, a method is created for operating an anti-theft system, particularly in the form of a access and/or starter system for a vehicle. A portable remote-operation identifier associated with said vehicle or more specifically said anti-theft system is designed to transmit a request signal with the instruction to detect the presence of objects associated with the vehicle within a particular area in and/or outside the vehicle. In addition, a vehicle-mounted part of the anti-theft system is designed to carry out the following steps. It receives the request signal and, in response to said request signal, checks for the presence of the objects in and/or outside the vehicle. Finally, after the check, the vehicle-mounted part of the anti-theft system transmits a result signal with information as to whether or not objects associated with the vehicle (or also only with the anti-theft system) were found during checking for their presence. The possibility of causing the vehicle-mounted part of the anti-theft system, by means of the request signal, to search for objects associated with the vehicle and to communicate a search result, creates a simple and convenient means of recovering objects mislaid near or inside the vehicle, thereby minimizing the risk of total loss of these objects. In particular, the method described also creates a further area of application for an anti-theft system, in particular a long-range access system, as a request signal can also be transmitted from a location far distant from the vehicle (for example, where the vehicle is no longer in visual range) in order to search for objects associated with the vehicle. A user therefore no longer needs to go directly to the vehicle in order to search for objects associated with the vehicle, but can do so, for example, by transmitting the request signal conveniently from home.

According to an embodiment, to check for the presence of the objects associated with a vehicle, a request signal is transmitted into the vehicle interior and/or the vehicle exterior by the vehicle-mounted part of the anti-theft system. The vehicle-mounted part of the anti-theft system then checks whether an object's response signal is received. The request signal is advantageously a radio signal, in particular in the LF (low frequency) range, e.g. with a frequency of 125 kHz. The response signal, on the other hand, can be a radio signal, in particular in the RF (radio frequency) range, e.g. with a frequency of 433 MHz. Therefore, a method similar to that of a conventional passive access system with a corresponding challenge/response dialog can be used to find objects. By using the same or similar algorithms to those used for authentication in an access system, no additional method or device complexity is necessary for searching for objects. It should also be noted that the response signal of an object can contain an identification indicating which object the response signal is coming from.

According to another embodiment, the request signal is transmitted by the portable i.e. user-carried identifier, e.g. in the form of a electronic key, associated with the vehicle or more specifically with the anti-theft system. The purpose of the identifier—also termed the user identification device—is basically to communicate with the vehicle-mounted part of the anti-theft system in order to authenticate itself to the vehicle-mounted part. If authentication is successful, the vehicle or rather its doors are finally locked or unlocked in the case of an access system, whereas in the event of successful authorization as part of a starter system, the vehicle's propulsion system can be activated. It is conceivable that the portable identifier has long-range functionality and therefore allows the user in question, by transmitting the request signal, to cause the vehicle to search for associated objects in the vicinity from a comparatively long way off, e.g. from a distance of one or two kilometers. Accordingly, the identifier can receive the result signal in order to output to the user the information contained therein concerning objects found. For this purpose, the identifier can output a visual, audible and/or mechanical signal (e.g. vibration) to the user. It should also be noted that it is also possible for the identifier to transmit an identification or an authentication code along with the request signal so that the vehicle recognizes that an authorized identifier wishes to initiate the search for objects.

The vehicle-associated objects which the vehicle-mounted part of the anti-theft system can search for in the proximity of the vehicle (inside or outside the vehicle) can be additional identifiers associated with the vehicle or other items connected to a communication device. Such communication devices can include a transceiver such as an RFID (Radio Frequency Identification) transponder, the vehicle-mounted part of the anti-theft system then being used as a kind of reader for the RFID transponder of an object.

According to an embodiment, spatial resolution of the location or locations at which the objects associated with the vehicle can be found shall be created. For this purpose, the vehicle-mounted part of the anti-theft system can have a plurality of antennas which can be mounted at different vehicle positions and therefore provide radio coverage of different specific areas in and/or outside the vehicle. One or more request signals can be transmitted by said antennas with a predefined field strength in each case, objects located in the receiving range of the respective antenna then answering in response to a request signal. For example, the antennas can transmit their request signals in a time-staggered manner so that the vehicle-mounted part of the anti-theft system can determine in response to which request signal a response signal has arrived within a particular time interval and can therefore infer the antenna transmitting the request signal and finally the location and position (receiving range of the antenna) of the responding object. It is also conceivable for one or more antennas to transmit a plurality of request signals with different field strengths. If no object responds to an initial low-field-strength request signal, this means that the object is not in the immediate vicinity of an antenna. However, if the field strength of a second request signal is increased, and an object then responds, an approximate distance of the object being searched for from the antenna transmitting the second request signal can now be inferred on the basis of the receiving range of the antenna.

According to another aspect, an anti-theft system, in particular in the form of an access and/or starter system for a vehicle, is created. Said anti-theft system has a vehicle-mounted part comprising a vehicle-mounted receiver for receiving a request signal with the instruction to detect the presence of objects associated with a vehicle in one or more particular areas of the vehicle. The vehicle-mounted part also comprises a vehicle-mounted control and evaluation device for checking for the presence of the objects in the one or more particular areas of the vehicle and for outputting information as to whether a vehicle-associated object has been found. Lastly, the vehicle-mounted part has a vehicle-mounted transmitter for transmitting a result signal with the information concerning the finding of objects. Therefore, in addition to its actual function of preventing the vehicle from being stolen, the anti-theft system also provides another function, namely that of locating particular objects in the proximity of the vehicle. In particular, the initiation of searching for objects by means of a request signal which can be transmitted, for example, by a device external to the vehicle from a particular distance from the vehicle, provides the user with a convenient means of initiating the searching process without having to go directly to the vehicle or to the vicinity thereof. This enables the loss, i.e. total loss, of particular objects mislaid in the proximity of the vehicle to be minimized.

According to one embodiment, to check for the presence of objects associated with a vehicle, the vehicle-mounted control and evaluation device can cause the vehicle-mounted transmitter to transmit at least one request signal into the one or more particular areas of the vehicle, said vehicle-mounted control and evaluation device detecting the presence of the object transmitting the response signal subject to receiving a respective response signal of an object via the receiver. In particular, said presence checking is performed in a radio-based manner, wherein, for example, a request signal can be transmitted in the low-frequency range (e.g. 125 kHz) and a corresponding response signal in the high-frequency range (e.g. 433 MHz). Such a mode of operation is similar to that of the anti-theft system as part of an access system in which an identifier associated with a user is authenticated by means of a similar challenge/response dialog.

An anti-theft system for a vehicle can also usually comprise, in addition to the vehicle-mounted part, one or more portable identifiers which are associated with, or rather carried by, one or more users. By means of a communication between a portable identifier and the vehicle-mounted part of the anti-theft system, or more precisely by authentication with same, it is possible in the event of positive authentication as part of an access system for the vehicle or rather its doors to be unlocked or locked, whereas in the event of positive authentication of an identifier as part of a starter system it is possible for the propulsion system of the vehicle to be activatable. According to one embodiment, portable identifiers, e.g. in the form of an electronic key, in addition to their just explained actual function of unlocking/locking a vehicle or activating a propulsion system, can also be designed to transmit the request signal (e.g. in the form of a radio signal) to the vehicle-mounted part of the anti-theft system, thereby causing it to search for objects in the vicinity of the vehicle (inside the vehicle and in its outer proximity). Accordingly, a portable identifier can also be designed to receive the result signal transmitted by the vehicle-mounted part and to output its content, i.e. the information about the finding of objects, to a user. For this purpose, the identifier can have one or more output devices for outputting visual, audible and/or mechanical signals. For example, an output device can comprise a display in which, e.g. in the case of an LCD (liquid crystal display), a particular symbol or an appropriate text message "object located" is output if one or more objects have been found. In addition, the display can have one or more LEDs (light-emitting diodes), in which case e.g. a (particular) LED flashes if one or more objects have been found in or around the vehicle. It is also possible for an output device to comprise a loudspeaker which emits a particular tone sequence in the event of objects being found. Finally, an output device can comprise a vibrator which produces a particular vibration pattern if one or more objects have been found in the proximity of the vehicle.

According to another embodiment, spatial resolution of the location at which a particular object is present in the proximity of the vehicle can be achieved. According to one possibility, the vehicle-mounted transmitter here comprises a plurality of antennas which can be mounted in different vehicle positions. Said vehicle-mounted transmitter can transmit one or more request signals (with a particular field strength) via the antennas, a response signal finally being receivable by the vehicle-mounted receiver from an object present in a receiving range of a respective antenna. In particular, the vehicle-mounted transmitter can drive the respective antennas in a time-staggered manner so that, if a response is received within a particular time interval after transmission of a particular request signal, the antenna receiving range within which the responding object is located can be inferred, thereby enabling spatial resolution.

It is also conceivable for the vehicle-mounted transmitter to have an antenna (or a plurality of antennas) which it drives with a plurality of request signals of different field strength. By transmitting a plurality of request signals with different field strengths, the receiving range for objects around the antenna can therefore be varied and therefore the approximate position of an object around the antenna can be determined if no response signal is received in response to particular request signals of particular field strength, whereas in the case of other request signals with e.g. higher field strength, a response signal is received by the vehicle-mounted receiver.

Reference will now be made to FIG. 1 which schematically illustrates a vehicle FZ with an anti-theft system. The vehicle-mounted part of said anti-theft system has, as a central unit, a vehicle-mounted control and evaluation device STAE. To implement a radio-based access system, said control and evaluation device STAE is connected to two communication devices K1 and K2 comprising transmitters S1 and S2 and receivers E1 and E2 respectively. To provide good radio coverage, but also spatial resolution of objects communicating with the communication devices K1 and K2, the communication device K1 has an external antenna A1A provided in the front exterior area of the vehicle and has an internal antenna A1I provided in the front interior area. The second communication device K2 correspondingly has an external antenna A2A in the rear exterior vehicle area, and has an internal antenna A2I in the rear interior area of the vehicle. Shown only schematically here are the receiving ranges of the respective antennas, namely the receiving range SBA1 of the external antenna A1A, the receiving range SBI1 of the internal antenna A1I, the receiving range SBA2 of the external antenna A2A and finally the receiving range SBI2 of the internal antenna A2I. Objects within the respective receiving ranges can finally communicate with the respective antennas. Suffice it to mention that the internal antenna A1I is designed to communicate with objects which are in the passenger compartment or rather passenger cell FGZ of the vehicle FZ, whereas the internal antenna A2I is designed to communicate with objects present in the trunk KOR of the vehicle FZ.

As part of the conventional function of a passive access system or passive access arrangement, a particular event (the pulling of a door handle or the approach of an identifier or a person to the vehicle) causes the transmitter S1 to send a request signal Q1 via the external antenna A1A e.g. to a user-associated identifier IDG1 which answers with a response signal R1 containing its identification, i.e. an authentication code. The receiver E1 receives the response signal R1 via the external antenna A1A and forwards its contents to the vehicle-mounted control and evaluation device STAE. The latter checks the validity of the authentication code or identification of the identifier and causes a door-closing device TS to unlock a vehicle door FZT assigned thereto. A corresponding challenge/response dialog can also be carried out e.g. via the internal antenna A1I with an identifier IDG located in the vehicle interior as part of a starter system or starting process. If, for example, a user carrying the identifier IDG2 with him presses a start/stop button to activate the propulsion system, the above-mentioned challenge/response dialog (request signal Q2, response signal R2) is carried out by the vehicle-mounted control and evaluation device via the first communication device K1, in the course of which the identifier IDG2 finally transmits its identification, i.e. its authentication code, via the communication device K1 to the vehicle-mounted control and evaluation device. The latter checks the authentication code/identification for validity and, in the event of a positive result, will enable a starting device MSE so that the latter activates the propulsion system (an internal combustion engine or an electric motor).

In addition to these actual functions of an anti-theft system, namely, as already described, as an access system or as a starter system, the anti-theft system shown in FIG. 1 is also able to search for particular objects, such as identifiers associated with the vehicle (e.g. the identifiers IDG1 and IDG2) in particular areas inside or outside the vehicle.

Let us assume the scenario in which a person traveling as a passenger in the vehicle FZ has lost his identifier IDG2 inside the vehicle. When said passenger becomes aware of the loss, but is already out of visual range of the vehicle FZ, the driver of the vehicle to which the identifier IDG3 is assigned wishes to determine from a distance whether the passenger has lost the identifier IDG2 in the proximity of the vehicle (inside or outside the vehicle in the immediate vicinity thereof). For such a search, he now uses his identifier IDG3, which is designed as follows.

It has three buttons TA1, TA2 and TA3, by means of which a user can issue particular control commands. For example, the button TA2 can be allocated the function of unlocking the vehicle, whereas the button TA3 can be allocated the function of locking the vehicle (corresponding to the function of a conventional electronic key for remotely controlling a vehicle's central locking). In the example in FIG. 1, the button TA1 shall be assigned the function of initiating the finding of objects in particular areas inside or outside the vehicle FZ associated with the identifier IDG3. If one of the three buttons is pressed by a user, appropriate information is passed to a control device ST in the identifier, said control device also being connected to a display DSP (e.g. an LCD) and a transceiver SE which are also present in the identifier. The transceiver SE additionally has an antenna AN in the identifier for sending and receiving signals, i.e. radio signals. It should be noted that the other identifiers IDG1 and IDG2 shown in the FIGURE are of identical design to the identifier IDG3 and will not therefore be explained separately.

If, as described above, the driver of the vehicle wishes to initiate a search for objects in the proximity of the vehicle FZ, in particular for the mislaid identifier IDG2, from a distance, in the first step he presses the button TA1 of his identifier IDG3. The control device ST detects the pressing of the button TA1 and instructs the transceiver SE to transmit via the antenna AN a request signal AFS instructing the vehicle FZ to search for objects associated with it in one or more areas inside or outside the vehicle FZ. More precisely, objects in the vehicle or in the immediate proximity outside the vehicle shall be searched for.

In a second step, the second communication device K2 or more precisely its receiver E2 receives the request signal AFS via the external antenna A2A and forwards it to the vehicle-mounted control and evaluation device STAE according to a third step. Triggered by said request signal, the vehicle-mounted control and evaluation device STAE, according to a third step, issues a command to the two communication devices K1 and K2 or more specifically to their transmitters S1 and S2 respectively, instructing them now to transmit request signals with a particular field strength via the external antennas A1A and A2A and via the internal antennas A1I and A2I, in order to search the receiving ranges, i.e. search areas SBA1, SBA2 as well as SBI1 and SBI2, for objects such as the identifier IDG2.

In the present case, as shown in FIG. 1, it is assumed that the identifier IDG2 searched for is in the vehicle interior, namely in the passenger cell FGZ. The identifier IDG2 therefore receives, according to a fourth step, via its antenna AN, the request signal Q2 transmitted by the internal antenna A1I. When said request signal has been received via the transceiver SE and forwarded to the control device ST of the identifier IDG2, the control device ST issues a command to the transceiver SE instructing it to send back via the antenna AN a response signal R2 according to a fifth step. According to a sixth step, the first communication device K1 or more precisely its receiver E1 now receives the response signal R2 via the antenna A1I and forwards it to the vehicle-mounted control and evaluation device STAE. It should be noted that in the present case it is assumed that the identifier IDG2 is the only object in the proximity of the vehicle (i.e. inside the vehicle or in the immediate vicinity outside the vehicle).

According to a seventh step, the vehicle-mounted control and evaluation device STAE now compiles the result of the search and generates information which in the simplest case indicates whether or not an object has been found in the proximity of the vehicle. According to an embodiment, the result information can also contain information about the number of objects found and/or can contain information about the search area in which one or more objects have been found. According to another embodiment, a found object with its response signal (in the above example the identifier IDG2 with the response signal R2) can transmit an identification of the object, so that a designation of the found object can also be included in the result information in addition or alternatively to the abovementioned data. For the following description it will be assumed that the result information contains information as to whether an object has been found, how many objects have been found, the search area in which they have been found, and where appropriate the designation of said found objects.

After compiling the result information, the vehicle-mounted control and evaluation device forwards said result information, according to an eighth step, to the second communication device K2 (but possibly also to the first communication device K1), so that a result signal EGS with the result information is transmitted or more specifically sent to the requesting identifier IDG3 via a corresponding transmitter S2 (or also S1).

In the identifier IDG3, according to step ten, the received result signal EGS is fed via the antenna AN and the transceiver SE to the control device ST which processes the result signal EGS and forwards it to the display DSP for displaying it to the user associated with the identifier IDG3 according to step eleven. According to the above search, for example, a result text "object located: identifier IDG2, in search area: passenger cell" can then appear on the display DSP. In this way the passenger now knows that his identifier IDG2 has been mislaid somewhere inside the vehicle, in the passenger cell, and can concentrate the search on this area, i.e. does not need to search for the identifier IDG2 in the area around the vehicle.

It should be noted that other items associated with the vehicle can also be provided with a corresponding transceiver. For example, a warning triangle or first-aid kit can be provided with a corresponding transceiver so that a vehicle driver knows at all times whether he is carrying with him in the vehicle the requisite items for operating a vehicle.

Although only the case where a identifier IDG2 has been forgotten or lost inside the vehicle and has been located by means of the vehicle-mounted part of the anti-theft system of the vehicle FZ has just been described, it is also conceivable that an identifier or other objects with a corresponding transceiver can be searched for or found by the vehicle FZ which are located outside the vehicle, in particular in the immediate vicinity of the vehicle, e.g. in the search areas SBA1 and SBA2. For this purpose, FIG. 1 also shows the identifier IDG1 which has been lost outside the vehicle by another passenger of the vehicle FZ. In a corresponding manner to the search process described above in respect of the identifier IDG2, a search process for the identifier IDG1 can also be triggered by means of an identifier IDG3, wherein, initiated by the receipt of the request signal AFS, request signals are again transmitted by the vehicle-mounted control and evaluation device STAE to the various antennas of the communication device K1 and K2, whereby in the example the identifier IDG1 receives a request signal Q1 and sends back a corresponding response signal R1 so that the vehicle-mounted control and evaluation device can now transmit a result signal back to the identifier IDG3 with information that an object has been found, namely the identifier IDG1, in a particular search area at front left outside the vehicle. Such result information can then also be indicated to the user again on the display DSP of the identifier IDG3 so that the user knows the approximate location of the identifier IDG1.

Finally the case will now be considered where, triggered by a request signal AFS (e.g. from the identifier IDG3), a search process for objects in the vehicle or in the immediate vicinity outside the vehicle is initiated, even though no object associated with the vehicle is in a search area.

After issuing the instruction, according to the third step described above, that request signals are to be transmitted into the search areas via the respective antennas, the vehicle-mounted control and evaluation device STAE will start a timer to measure the time. If a predetermined time interval TM has elapsed within which no response signal has been received from any antenna, the control and evaluation device assumes that no object is present in a search area and will now, in the abovementioned step 7, produce the aggregate result that no object has been found. This result is again communicated analogously to the methods described above.

While it is advantageous for a portable identifier, as part of an anti-theft system, that signal authentication takes place for transmitting a signal or more specifically a radio signal, corresponding to the pressing of one of the buttons to activate vehicle unlocking or locking, as has been explained in respect of the buttons TA2 or TA3 on the identifier IDG3, it is conceivable that, even for searching for objects, corresponding to the pressing of the button TA1 explained above, authentication of the signal AFS initiating the search for objects shall also take place. For this purpose, for example, simultaneously with the signal AFS, an identification code can be sent which is then checked for authorization or validity by the control and evaluation device STAE in the vehicle. Only if the identification code is valid will the search for objects be carried out. Consequently, an identifier can be implemented in a simple form as a remote control only for searching for objects in or close to the vehicle, whereas it can also be implemented in an enhanced form as a remote control for also unlocking or locking the vehicle.

What is claimed is:

1. A method for operating an anti-theft system for a vehicle, wherein a portable identifier associated with the anti-theft system performs the following step: transmitting a request signal with the instruction to detect the presence of objects associated with the vehicle in at least one of: in a particular area in the vehicle and in a particular area outside the vehicle;

and wherein a vehicle-mounted part of the anti-theft system performs the following steps:

receiving the request signal by a processor;

checking for the presence of objects of at least one of in and outside the vehicle;

transmitting by said processor a result signal with information as to whether objects associated vehicle have been found during checking for the presence thereof.

2. The method according to claim 1, wherein presence checking comprises the following steps:

transmitting a request signal into at least one of the vehicle interior and exterior;

checking whether a response signal of an object is received.

3. The method according to claim 1, wherein the portable identifier associated with the vehicle is also designed to receive the result signal.

4. The method according to claim 1, wherein the objects associated with a vehicle include additional identifiers associated with the vehicle, or other items provided with a communication device.

5. The method according to claim 1, whereby during presence checking in at least one of the vehicle interior and vehicle exterior a plurality of request signals with different field strengths or a plurality of request signals at different positions are transmitted.

6. An anti-theft system for a vehicle, comprising:

a portable identifier for transmitting a request signal with the instruction to detect the presence of objects associated with a vehicle in at least one of: in a particular area in and outside the vehicle;

a vehicle-mounted receiver for receiving a request signal;

a vehicle-mounted control and evaluation device for checking for the present of objects in the one or more particular areas of the vehicle and for outputting information as to whether an object associated with the vehicle has been found;

a vehicle-mounted transmitter for transmitting a result signal with the information concerning the finding of objects.

7. The anti-theft system according to claim 6, wherein, to check for the presence of the objects, the vehicle-mounted control and evaluation device causes the vehicle-mounted transmitter to transmit at least one request signal into one or more particular areas of the vehicle, and the vehicle-mounted control and evaluation device, depending on receipt of a respective response signal via the vehicle-mounted receiver, detects the presence of an object transmitting the response signal.

8. The anti-theft system according to claim 6, wherein the portable identifier is also designed, by means of an authentication, to effect locking or unlocking of the vehicle or to activate the propulsion system.

9. The anti-theft system according to claim 6, wherein the result signal is received by the portable identifier.

10. The anti-theft system according to claim 9, wherein the portable identifier has a display for indicating the content of the result signal to a user.

11. The anti-theft system according to claim 6, wherein to check for the presence of the objects, the vehicle-mounted control and evaluation device causes the vehicle-mounted transmitter to transmit a plurality of request signals of different field strengths.

12. The anti-theft system according to claim 6, wherein the vehicle-mounted transmitter has a plurality of antennas for mounting in different positions on the vehicle, wherein, to check for said presence, the vehicle-mounted control and evaluation device causes the vehicle-mounted transmitter to transmit a plurality of request signals at the different positions.

13. A vehicle comprising an anti-theft system, with:
a portable identifier for transmitting a request signal with the instruction to detect the presence of objects associated with a vehicle in a particular area (SBA1, SBA2, SBI1, SBI2) in and/or outside the vehicle;
a vehicle-mounted receiver for receiving a request signal;
a vehicle-mounted control and evaluation device for checking for the present of objects in the one or more particular areas of the vehicle and for outputting information as to whether an object associated with the vehicle has been found;
a vehicle-mounted transmitter for transmitting a result signal with the information concerning the finding of objects.

14. The vehicle according to claim 13, wherein the vehicle is a motor vehicle.

15. The vehicle according to claim 13, wherein, to check for the presence of the objects, the vehicle-mounted control and evaluation device causes the vehicle-mounted transmitter to transmit at least one request signal into one or more particular areas of the vehicle, and the vehicle-mounted control and evaluation device, depending on receipt of a respective response signal via the vehicle-mounted receiver, detects the presence of an object transmitting the response signal.

16. The vehicle according to claim 13, wherein the portable identifier is also designed, by means of an authentication, to effect locking or unlocking of the vehicle or to activate the propulsion system.

17. The vehicle according to claim 13, wherein the result signal is received by the portable identifier.

18. The vehicle according to claim 17, wherein the portable identifier has a display for indicating the content of the result signal to a user.

19. The vehicle according to claim 13, wherein, to check for the presence of the objects, the vehicle-mounted control and evaluation device causes the vehicle-mounted transmitter to transmit a plurality of request signals of different field strengths.

20. The vehicle according to claim 13, wherein the vehicle-mounted transmitter has a plurality of antennas for mounting in different positions on the vehicle, wherein, to check for said presence, the vehicle-mounted control and evaluation device causes the vehicle-mounted transmitter to transmit a plurality of request signals at the different positions.

* * * * *